United States Patent
Morris et al.

(10) Patent No.: US 12,182,768 B2
(45) Date of Patent: Dec. 31, 2024

(54) VIRTUAL MEETING PARTICIPATION

(71) Applicant: Avaya Management L.P., Durham, NC (US)

(72) Inventors: Tommy Morris, Galway (IE); Dara Geary, Galway (IE)

(73) Assignee: Avaya Management L.P., Durham, NC (US)

( * ) Notice: Subject to any disclaimer, the term of this patent is extended or adjusted under 35 U.S.C. 154(b) by 219 days.

(21) Appl. No.: 17/807,971

(22) Filed: Jun. 21, 2022

(65) Prior Publication Data
US 2023/0410058 A1 Dec. 21, 2023

(51) Int. Cl.
| | |
|---|---|
| *G10L 15/05* | (2013.01) |
| *G06F 3/048* | (2013.01) |
| *G06F 9/451* | (2018.01) |
| *G06Q 10/1093* | (2023.01) |

(52) U.S. Cl.
CPC ......... *G06Q 10/1095* (2013.01); *G06F 3/048* (2013.01); *G06F 9/453* (2018.02); *G10L 15/05* (2013.01)

(58) Field of Classification Search
None
See application file for complete search history.

(56) References Cited

U.S. PATENT DOCUMENTS

| | | |
|---|---|---|
| 8,019,069 B1 | 9/2011 | Cyriac et al. |
| 9,021,118 B2 | 4/2015 | John et al. |
| 9,112,978 B2 | 4/2015 | Gilbert et al. |
| 9,112,979 B2 | 8/2015 | Gilbert et al. |
| 9,253,330 B2 | 2/2016 | Boss et al. |
| 9,402,104 B2 | 7/2016 | John et al. |
| 9,774,825 B1 | 9/2017 | John et al. |
| 10,063,706 B2 | 8/2018 | Abuelsaad et al. |
| 10,230,774 B2 | 3/2019 | Saez |
| 10,313,845 B2 | 6/2019 | Koul et al. |
| 2007/0008911 A1 | 1/2007 | MacFarlane et al. |
| 2007/0260685 A1* | 11/2007 | Surazski ............... G06Q 10/10 709/204 |
| 2007/0263805 A1 | 11/2007 | McDonald |
| 2009/0083694 A1 | 3/2009 | Argott |
| 2009/0100140 A1* | 4/2009 | McVicker ............ G06Q 10/107 709/206 |
| 2010/0235216 A1 | 9/2010 | Hehmeyer et al. |
| 2013/0251132 A1 | 9/2013 | Manor |

(Continued)

OTHER PUBLICATIONS

"Systems and Methods for Providing Electronic Event Information"; U.S. Appl. No. 17/220,485, filed Apr. 1, 2021.

(Continued)

*Primary Examiner* — Kyle Zhai
(74) *Attorney, Agent, or Firm* — Stevens & Showalter LLP

(57) ABSTRACT

A method for participating in a virtually-attended meeting including: determining that a user is virtually attending a meeting; monitoring the virtually-attended meeting for a triggering event; detecting an occurrence of the triggering event; determining whether to send a high-level notification to the user; capturing a portion of the virtually-attended meeting; and sending the high-level notification. Also disclosed is a method where the high-level notification is sent to a second user along with a message from the first user about how to respond to the notification. Also disclosed is a corresponding system.

18 Claims, 10 Drawing Sheets

(56) References Cited

U.S. PATENT DOCUMENTS

| | | | | |
|---|---|---|---|---|
| 2013/0343585 | A1* | 12/2013 | Bennett | H04W 4/80 |
| | | | | 381/317 |
| 2015/0007036 | A1* | 1/2015 | Jin | H04L 67/10 |
| | | | | 715/733 |
| 2015/0249747 | A1 | 9/2015 | Boss et al. | |
| 2019/0334733 | A1* | 10/2019 | Jaiswal | H04L 67/54 |
| 2020/0258029 | A1 | 8/2020 | Jung et al. | |
| 2020/0334642 | A1 | 10/2020 | Vaananen | |
| 2020/0358908 | A1* | 11/2020 | Scalisi | G08B 13/19667 |
| 2022/0030042 | A1* | 1/2022 | Roedel | H04L 65/4015 |
| 2022/0286312 | A1* | 9/2022 | Tiwari | H04L 12/1822 |
| 2022/0407731 | A1* | 12/2022 | Jenkins | H04L 12/1827 |
| 2023/0115674 | A1* | 4/2023 | Nighman | H04B 17/318 |
| | | | | 381/58 |

OTHER PUBLICATIONS

"Systems and Methods for Providing Electronic Event Attendance Mode Recommendations"; U.S. Appl. No. 17/461,383, filed Aug. 30, 2021.

Casillas. Roland J.; Non-final Office Action Dated Apr. 13, 2022; U.S. Appl. No. 17/220,485; United States Patent and Trademark Office; Alexandria, Virginia.

Casillas, Roland J.; Final Office Action Dated Aug. 23, 2022; U.S. Appl. No. 17/220,485; United States Patent and Trademark Office; Alexandria, Virginia.

Casillas, Roland J.; Notice of Allowance Dated Dec. 27, 2022; U.S. Appl. No. 17/220,485; United States Patent and Trademark Office; Alexandria, Virginia.

Casillas, Roland J.; Second Notice of Allowance Dated Jan. 6, 2023; U.S. Appl. No. 17/220,485; United States Patent and Trademark Office; Alexandria, Virginia.

Casillas. Roland J.; Non-Final Office Action Dated May 11, 2022; U.S. Appl. No. 17/461,383; United States Patent and Trademark Office; Alexandria, Virginia.

Casillas, Roland J.; Notice of Allowance Dated Oct. 21, 2022; U.S. Appl. No. 17/461,383; United States Patent and Trademark Office; Alexandria, Virginia.

Casillas, Roland J.; Second Notice of Allowance Dated Dec. 2, 2022; U.S. Appl. No. 17/461,383; United States Patent and Trademark Office; Alexandria, Virginia.

* cited by examiner

VIRTUAL MEETING PARTICIPATION

BACKGROUND

The present disclosure relates generally to systems and methods for allowing a user to virtually participate in an online meeting, and specifically to presenting one or more notifications to the user about one or more trigger events during the virtually-attended meeting, allowing the user to interact with other meeting participants, and seamlessly transitioning to active participation as needed.

With the increase in availability of online communication methods such as messaging systems, video calls, etc., more online meetings are being held instead of in-person meetings. Sometimes due to scheduling conflicts, two meetings of interest can be scheduled for the same time slot and cannot easily be moved. While it is possible for an individual to attend two or more online meetings at once or to attend one meeting in person while simultaneously attending one or more additional online meetings, the individual typically is able to actively listen and/or participate in only one meeting. In addition, the individual may attend a single online meeting while engaged in other activities. All of these scenarios could create delays in the online meeting(s), particularly if the person is expected to speak or otherwise contribute in the online meeting(s) and the participants in the online meeting(s) are unaware that the person is attending another meeting at the same time or is otherwise occupied.

BRIEF SUMMARY

In accordance with one aspect of the present disclosure, a method for participating in a virtually-attended meeting comprises determining that a user is virtually attending a meeting; monitoring the virtually-attended meeting for a triggering event; detecting an occurrence of the triggering event; determining, in response to detecting the occurrence of the triggering event in the virtually-attended meeting, based on one or more rules, whether to send a high-level notification to the user; capturing, in response to determining that the user should be sent the high-level notification, a portion of the virtually-attended meeting, wherein the portion of the virtually-attended meeting comprises a predetermined amount of time surrounding the triggering event; and sending, to a device associated with the user, the high-level notification, wherein the high-level notification comprises the portion of the virtually-attended meeting.

In accordance with another aspect of the present disclosure, a system for participating in a virtually-attended meeting comprises a processor coupled to memory, wherein the memory includes a program that instructs the processor to perform: determining that a user is virtually attending a meeting; monitoring the virtually-attended meeting for a triggering event; detecting an occurrence of the triggering event; determining, in response to detecting the occurrence of the triggering event in the virtually-attended meeting, based on one or more rules, whether to send a high-level notification to the user; capturing, in response to determining that the user should be sent the high-level notification, a portion of the virtually-attended meeting, wherein the portion of the virtually-attended meeting comprises a predetermined amount of time surrounding the triggering event; and sending, to a device associated with the user, the high-level notification, wherein the high-level notification comprises the portion of the virtually-attended meeting.

In accordance with another aspect of the disclosure, a method for participating in a virtually-attended meeting comprises determining that a first user is virtually attending a meeting; monitoring the virtually-attended meeting for a triggering event; detecting an occurrence of the triggering event; determining, in response to detecting the triggering event in the virtually-attended meeting, based on one or more rules, whether to send a high-level notification to the first user; capturing, in response to determining that the high-level notification should not be sent to the first user, a portion of the virtually-attended meeting, wherein the portion of the virtually-attended meeting comprises a predetermined amount of time surrounding the triggering event; and sending, to a device associated with a second user, a message comprising the portion of the virtually-attended meeting.

DETAILED DESCRIPTION

The above-discussed issues with current meeting systems are addressed by the systems and methods of the present disclosure. As described herein, a user may virtually attend one or more meetings, via an automated attendee, to allow the user to focus on work that is not related to a meeting. Furthermore, a user may concurrently attend multiple meetings, where one meeting is actively attended and one or more meetings are virtually attended. The system may monitor the one or more virtually-attended meetings and may notify the user when a triggering event is detected in the one or more virtually-attended meetings. In some examples, the user may define what triggering events are important enough to interrupt the user's work and/or other meeting(s). The system may then provide the user options to reply to the triggering event of the one or more virtually-attended meetings. The system may also allow the user to delegate the reply to a second user, which may minimize disruption for the first user. Systems and methods described herein may allow for more efficient usage of human and system resources by simplifying meeting scheduling and minimizing the number of meetings being actively attended.

Figure 1:
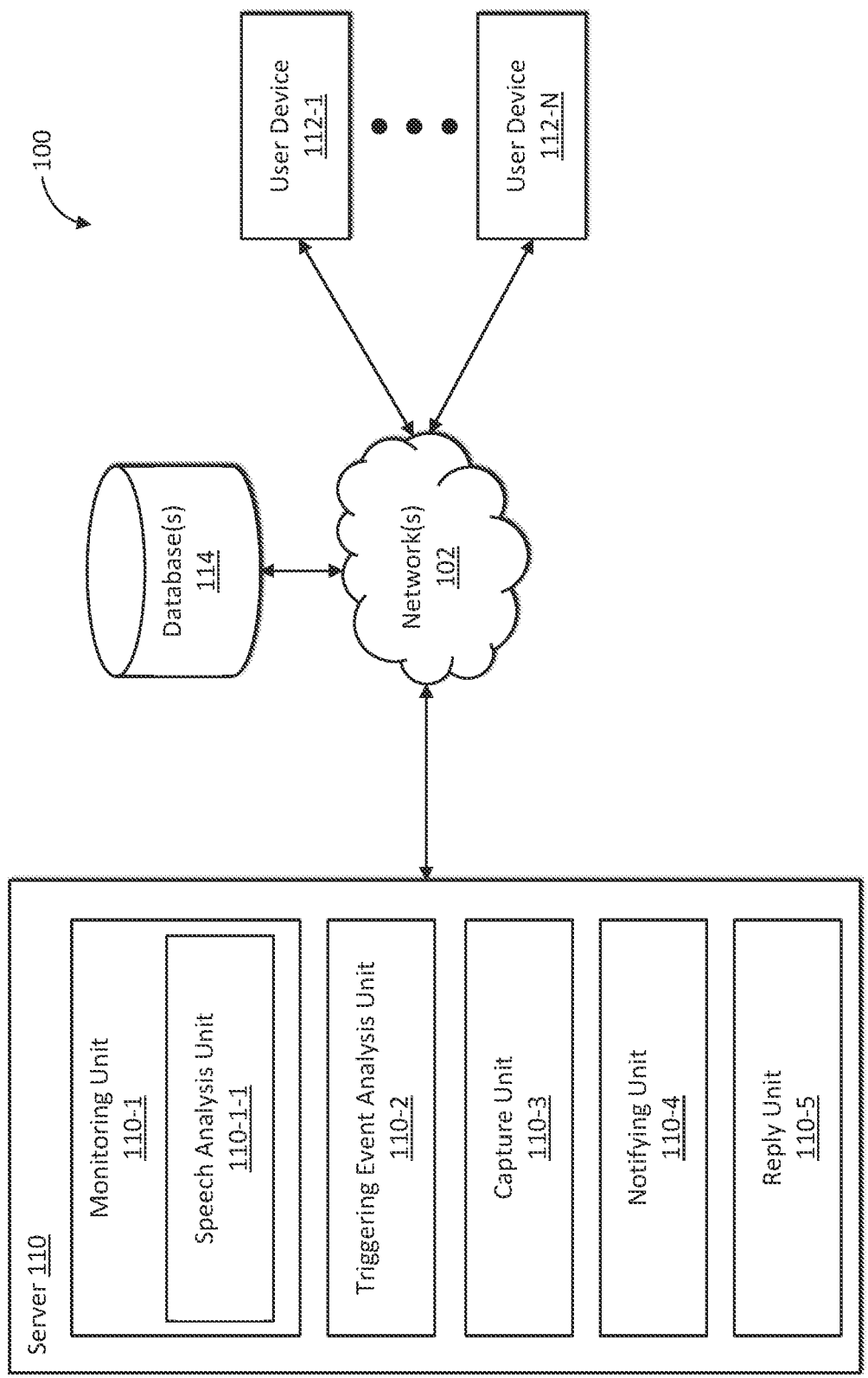
FIG. 1 is a block diagram of a system, in accordance with the present disclosure.

With reference to the drawings, FIG. 1 depicts a block diagram of a system 100 in accordance with the present disclosure. The system 100 may comprise a server 110, a set of one or more data stores or databases 114, and one or more user devices 112-1 to 112-N (referred to herein collectively as 112), all of which may be connected by one or more networks 102. The network 102 may comprise, for example, an intranet, a local area network (LAN), a wide area network (WAN), the Internet, or a combination thereof. The user device 112 may include, but is not limited to, a desktop computer, laptop computer, tablet, smartphone, Internet Protocol (IP) hardphone, IP softphone, a webcam, and the like. The user device 112 and/or database(s) 114 may be physically collocated with the server 110, and in other examples, the user device 112 and/or database(s) 114 may be at a remote location that is physically separate from the server 110. It may be understood that the system 100 may comprise other servers (not shown), such as a web server, presence server, etc.

The system 100 may be an enterprise system and may be used in the context of a contact center or other enterprise with multiple employees. The system 100 may also be for personal (i.e., non-commercial) use. The database(s) 114 may be used to store information related to the users and/or their associated user device(s) 112, as well as information about the enterprise and/or its customers (if applicable). The server 110 may receive and aggregate various information related to one or more users and one or more meetings, as described below. The server 110 may comprise, for example, a monitoring unit 110-1, which may comprise a speech analysis unit 110-1-1; a triggering event analysis unit 110-2; a capture unit 110-3; a notifying unit 110-4; and a reply unit 110-5. Although the monitoring unit 110-1, triggering event analysis unit 110-2, capture unit 110-3, notifying unit 110-4, and reply unit 110-5 are depicted as residing on the server 110, it may be understood that these components may be located in and/or implemented by one or more separate servers.

As described below, the monitoring unit 110-1 may determine that a user is virtually attending one or more meetings. The monitoring unit 110-1 may also monitor the one or more virtually-attended meetings for a triggering event and may detect the triggering event. The triggering event analysis unit 110-2 may conduct complex analysis to determine whether a notification is needed, and if so, what level of notification is needed. The capture unit 110-3 may record the virtually-attended meeting(s) and may, in response to detection of an occurrence of the triggering event in one of the virtually-attended meetings, capture a portion of the virtually-attended meeting. The notifying unit 110-4 may provide a notification to the user when a triggering event occurs. The reply unit 110-5 may receive a reply from the user and may present the reply in the virtually-attended meeting.

FIGS. 2A-2D and 3 illustrate exemplary methods 200A-200D for participating in a virtually-attended meeting, in accordance with the present disclosure. These methods may be performed by one or more servers (e.g., server 110 in FIG. 1), one or more communication devices (e.g., user devices 112 in FIG. 1), or combinations thereof. The methods 200A-200D may run continuously for a duration of the virtually-attended meeting and/or until the user disconnects from the virtually-attended meeting, e.g., if the virtually-attended meeting runs over the allotted time.

Figure 2A:
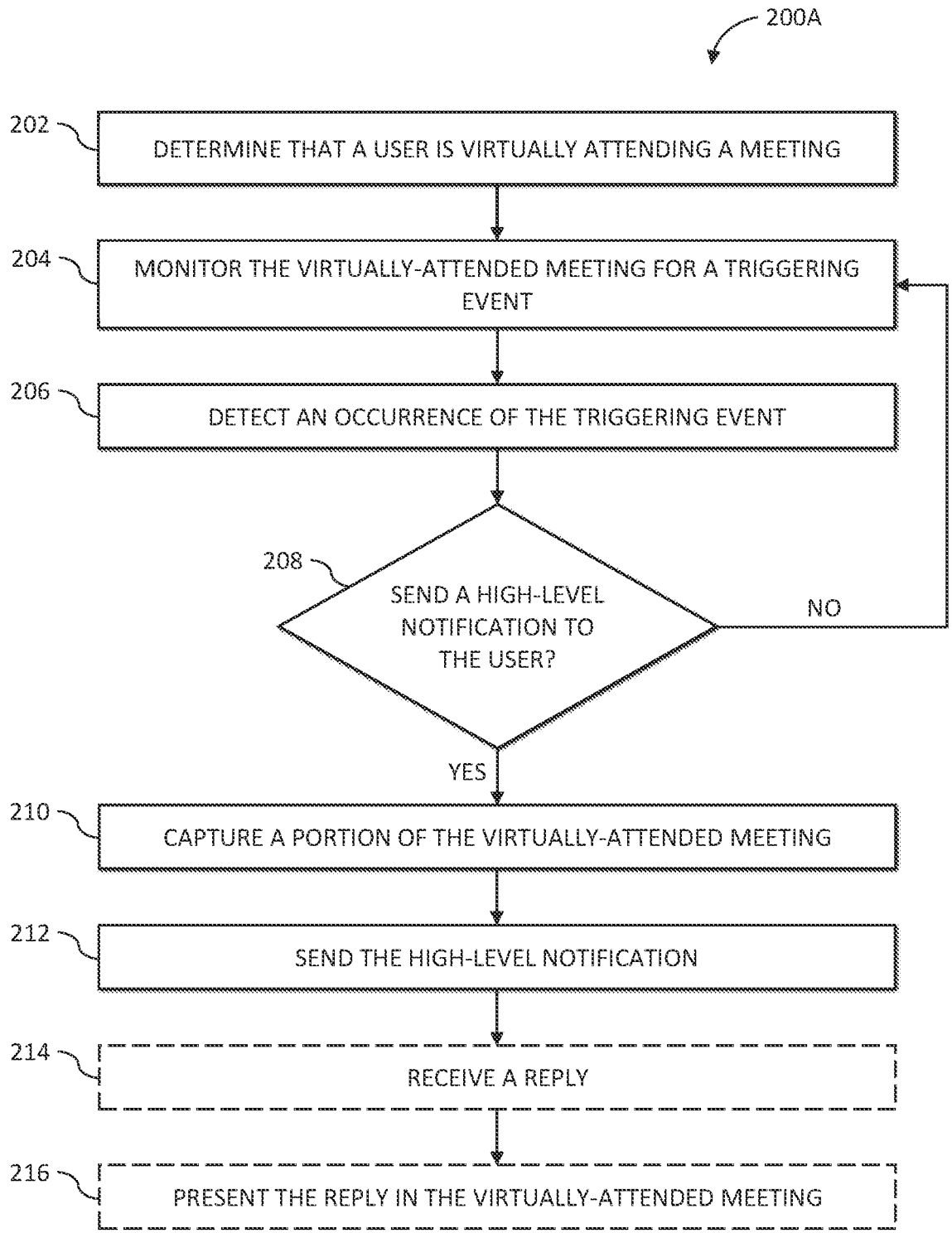
FIGS. 2A-2D are flowcharts illustrating processes for participating in a virtually-attended meeting, in accordance with various aspects of the present disclosure.

With reference to the method 200A in FIG. 2A, at 202, it is determined that a user is virtually attending, via the server 110 and/or a device associated with the user, e.g., user device 112, a meeting. These functions may be performed by, for example, the monitoring unit 110-1 of the server 110 (FIG. 1). It may be determined that a meeting is being virtually attended by, for example, detecting that a meeting application on the user device 112 is in virtual mode or by using a calendaring application of the user device 112 and detecting that the user selected virtual attendance for the meeting. While only one virtually-attended meeting is discussed with respect to FIG. 2A, it is contemplated that the user may concurrently attend two or more virtually-attended meetings. Alternatively, or in addition, it may be determined that the user is concurrently attending one actively-attended meeting (in person or online) and one or more virtually-attended meetings.

An "online" meeting is conducted via computer and/or telephony software, in which one or more participants are not co-located with one or more other participants. A meeting is "actively attended" when a (human) user attends the meeting, either in person or online via audio and/or video (e.g., via the user device 112), and is actively listening to, viewing, and/or otherwise participating in the meeting in real time. A meeting is "virtually attended" when an automated attendee representing the user, e.g., via an avatar or other graphical representation of the user as described herein, attends the meeting on the user's behalf, i.e., the user is not attending and is not physically listening to and/or viewing the meeting in real time. The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

At 204, the virtually-attended meeting is monitored for a triggering event. For example, the server 110 may monitor the virtually-attended meeting via the monitoring unit 110-1. The triggering event may be a single event or one or more events and may be configured by the user, as described herein. At 206, an occurrence of the triggering event is detected in the virtually-attended meeting. For example, the server 110 may detect the occurrence of the triggering event via the monitoring unit 110-1. As discussed below with reference to FIGS. 2B-2D, the triggering event may include the utterance of one or more keywords, the use of one or more keywords in a question, and/or a change in a sentiment of the virtually-attended meeting. Additionally, someone actively attending the meeting may verbally request to notify the user, or as discussed below with reference to FIG. 5, someone actively attending the meeting may cause the system to notify the user.

At 208, it is determined, based on one or more rules, whether to send the user a high-level notification. For example, the server 110 may determine, via the triggering event analysis unit 110-2 and based on the one or more rules, whether to send the high-level notification, as described herein. The one or more rules may be stored in, for example, the database(s) 114 (see FIG. 1). When it is determined that the high-level notification should not be sent to the user, the method 200A may return to 204, in which the virtually-attended meeting is monitored for a triggering event.

In response to determining that the user should be sent the high-level notification, a portion of the virtually-attended meeting is captured at 210. As described herein, the portion of the virtually-attended meeting that is captured may comprise a predetermined amount of time surrounding the triggering event, e.g., a predetermined amount of time before and/or after the triggering event. In some examples, the portion may comprise 90 seconds before and 90 seconds after the triggering event. As discussed below with reference to FIG. 4, the user may set other predetermined times. For example, the server 110 may be recording the virtually-attended meeting via the capture unit 110-3, including audio, video, and/or text. The capture unit 110-3 may selectively capture a portion of the recording prior to and/or after the triggering event. The captured portion may include a text transcript of the virtually-attended meeting, an audio recording of the virtually-attended meeting, and/or a video recording of the virtually-attended meeting.

At 212, the high-level notification containing the captured portion of the virtually-attended meeting is sent to a device associated with the user, e.g. user device 112. For example, the server 110 may send the high-level notification via the notifying unit 110-4. The notifying unit 110-4 may send the high-level notification using methods known in the art. For instance, the notifying unit 110-4 may send the high-level notification via email, short message service (SMS) message, and/or notification application(s) on the user's device 112. After sending the high-level notification at 212, the method 200A may return to 204 and resume monitoring the virtually-attended meeting for a triggering event.

Following transmission of the high-level notification at 210 in FIG. 2A, a reply may optionally be received from the user device 112 at 214, and at 216, the reply from the user may be presented in the virtually-attended meeting. These functions may be performed by, for example, the reply unit 110-5 of the server 110 (FIG. 1). As discussed below with reference to FIG. 7A, the user may reply with a text-based message, a recorded audio message, and/or a recorded video message. In some examples, the user may prepare the reply in real-time. In other examples, the user may anticipate that certain questions will be asked in the virtually-attended meeting and/or may be presented with a list of questions prior to the meeting. The user may prepare responses ahead of time and select one of the pre-prepared responses as the reply.

Alternatively, the user may decide to join the virtually-attended meeting with active attendance. For example, instructions may be received from the device associated with the user, e.g., user device 112, to temporarily change the user to active participation in the virtually-attended meeting. The user may be joined, via the device associated with the user, e.g., user device 112, to the meeting in an "active" mode, and the reply may then be presented, in real-time, by the user in the meeting.

If the user replies with a text-based message, the text reply may be displayed for the other attendees in the virtually-attended meeting to read, e.g., via the user device(s) 112 of the other attendees. Alternatively, the reply unit 110-5 may comprise a text-to-speech engine (not shown) that converts the text to speech and plays the reply for the other attendees. If the user replies with an audio or video recording, the reply unit 110-5 may play the reply for the other attendees or alternatively, may convert the speech to text (e.g., via a speech-to-text engine (not shown)) and display the text of the reply to the other attendees. In some examples, prior to presenting a reply, the reply unit 110-5 may use the "raise hand" function to notify a meeting leader that a reply has been received and allow him or her to decide when and how the reply should be presented. If the user joins the virtually-attended meeting as an active participant, the user may use the "raise hand" function and present the reply in real-time.

In some instances, a quiet period may be detected during the first meeting, and the user may be prompted, e.g., via a message, badge, or other known type of notification or alert sent to the user's device 112, to prepare a reply to the high-level notification during the quiet period. A "quiet period" may be a period during a meeting when information or opinion is not being actively presented by or to the attendees. Quiet periods may occur, for example, during a change of speakers or during a break in the meeting. A quiet period may be detected based, in part, on changes in volume during the meeting, which may be detected via a microphone (not shown) of the user's device 112.

In other instances, after receiving the high-level notification, the user may choose to delegate the reply to another user. Instructions may be received from the device associated with the (first) user, e.g., user device 112, to send a message to a second device associated with a second user, e.g., another one of user devices 112, in which the message may include the high-level notification and/or one or more suggestions for responding to the high-level notification. The second user may then prepare a reply that is presented in the virtually-attended meeting, as described in more detail below with respect to FIG. 3. Alternatively, the second user may determine that the high-level notification should be addressed by the first user and may send a message to the first user.

Figure 2B:
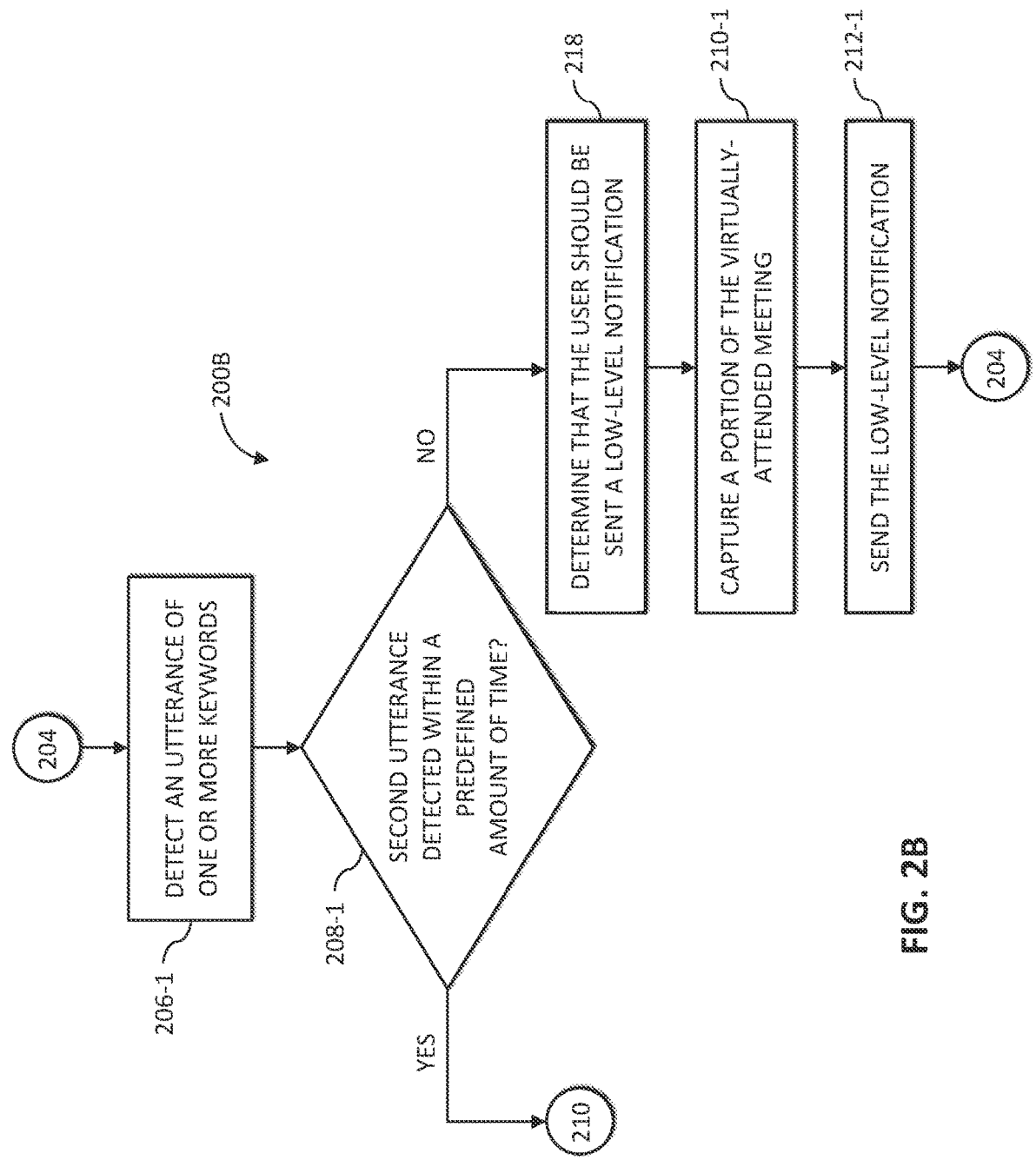
Figure 2D:
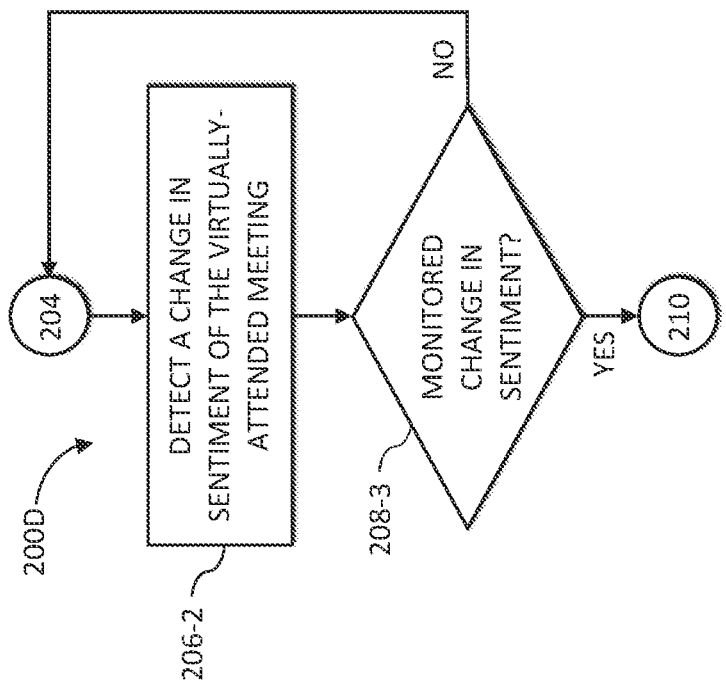
Figure 2C:
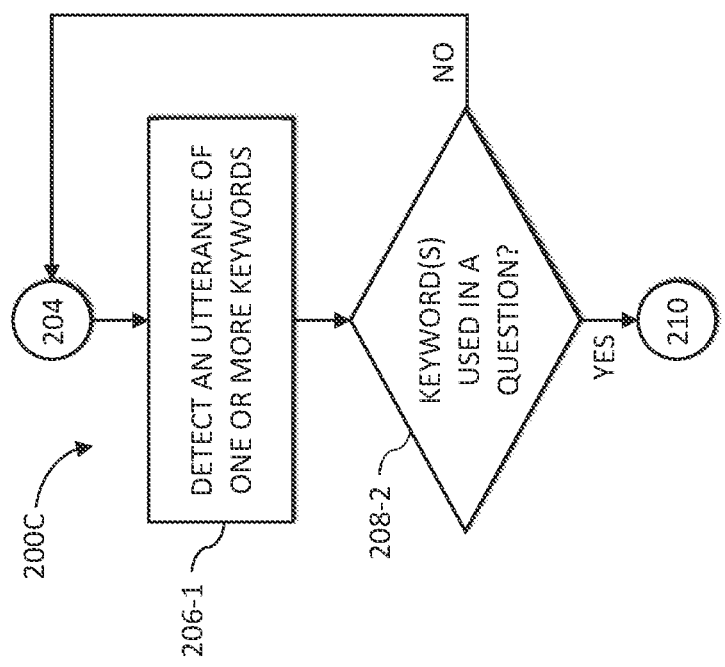

In the examples shown in FIGS. 2B and 2C, detecting the triggering event (e.g., at 206 in FIG. 2A) may comprise detecting an utterance of one or more keywords, which may be analyzed to determine whether to send the user the high-level notification, a low-level notification, or no notification. As described herein, the monitoring unit 110-1 of the server 110, specifically the speech analysis unit 110-1-1, may detect the utterance(s) of the one or more keywords; the triggering event analysis unit 110-2 may perform analysis and determine, based on one or more rules, whether to send a high-level notification, a low-level notification, or no notification; and the notifying unit 110-4 may generate and transmit the notification.

In the method 200B shown in FIG. 2B, an utterance of one or more keywords is detected at 206-1, in which the utterance may be a first utterance of the one or more keywords. The term "keyword" may include single words or phrases comprising two or more words. For example, the speech analysis unit 110-1-1 may receive a transcript and/or audio recording of the virtually-attended meeting, and using known techniques, such as automatic speech recognition (ASR) and/or natural language processing (NLP), the speech analysis unit 110-1-1 may compare the transcript and/or recording of the virtually-attended meeting to a list of keywords to detect an utterance of one or more of the keywords.

At 208-1, it may be determined whether a second, subsequent utterance of one or more keywords is detected within a predefined amount of time from the first utterance. When the second utterance is detected within the predefined amount of time, it may be determined that the user should be sent the high-level notification, after which the method 200B may return to the method 200A shown in FIG. 2A and may proceed with capturing a portion of the virtually-attended meeting at 210. The second utterance of one or more keywords may be a repeat of the first utterance or may be an utterance of another of the one or more keywords. The predefined amount of time may be 5 seconds, 10 seconds, etc. Alternatively, or in addition, the second utterance may be within a predetermined number of words (e.g., 5 words, 10 words, etc.) of the first utterance. As discussed below with reference to FIG. 4, the user may set the predefined amount of time and/or the predefined number of words. Additionally, the speech analysis unit 110-1-1 may detect, for example, groups or patterns of keywords, and in some particular examples, the speech analysis unit 110-1-1 may detect one or more occurrences of the user's name being uttered along with one or more other keywords.

In some examples, prior to sending a high-level notification, a meeting organizer may be notified that a high-level notification should be sent. The meeting organizer may then decide whether to send the high-level notification to the user. By allowing the meeting organizer to review the high-level notification, "false flag" notifications (i.e., a notification that the user does not need to receive) may be reduced or prevented. Based on whether the meeting organizer does or does not transmit the high-level notification, the triggering event analysis unit 110-2 may also learn situations where a high-level notification should be sent versus when a high-level notification should not be sent.

When a second utterance of one or more keywords is not detected within a predefined amount of time from, or within a predetermined number of words of, the first utterance (i.e., only the first utterance of the one or more keywords is detected) at 208-1, it may be determined that the user should be sent a low-level notification at 218. At 210-1, a portion of the virtually-attended meeting is captured, as described above with respect to FIG. 2A, and at 212-1, the low-level notification is then sent to the device associated with the user, e.g., user device 112, using methods known in the art. Following transmission of the low-level notification, the method 200B may return to the method 200A shown in FIG. 2A and may resume monitoring the virtually-attended meeting for a triggering event at 204. In some examples (not shown), when only the first utterance of the one or more keywords is detected, it may be determined that the no notification should be sent.

In another example method 200C depicted in FIG. 2C, an utterance of one or more keywords may be detected at 206-1, as described above, and at 208-2, it may be determined whether the one or more keywords are used in a question. For example, the speech analysis unit 110-1-1 may use ASR, NLP, and other known techniques to detect the utterance of one or more keywords and may determine that the one or more keywords are used in a question, e.g., by detecting an upward inflection in a speaker's voice, by detecting use of a question mark in a text-based communication, etc. When it is detected that the one or more keywords are used in a question at 208-2, it may be determined that the user should be sent the high-level notification, after which the method 200C may return to the method 200A shown in FIG. 2A and proceed with capturing a portion of the virtually-attended meeting at 210. When it is determined at 208-1 that the one or more keywords are not used in a question, the method 200C may return to the method 200A shown in FIG. 2A and resume monitoring the virtually-attended meeting for a triggering event at 204. In some instances (not shown), after it is determined that a high-level notification is not warranted at 208-2, a low-level notification may optionally be sent to the user after the conclusion of 208-2, as described above with respect to FIG. 2B, or no notification may be sent.

In a further example method 200D depicted in FIG. 2D, detecting the triggering event (e.g., at 206 in FIG. 2A) may comprise detecting a change in a sentiment of the virtually-attended meeting at 206-2. For example, the speech analysis unit 110-1-1 may use known sentiment analysis and speech recognition techniques to determine that a change in sentiment has occurred, such as a sudden change in volume in the virtually-attended meeting (e.g., shouting); language; sounds (e.g., sighing), and/or speech behavior (e.g., attendees speaking over each other) that may indicate anger, frustration, boredom, etc.; and the like. At 208-3, it may be determined whether the change in sentiment is a monitored change in sentiment, i.e., a change in sentiment for which the user has requested notification, and if so, it may be determined that the user should be sent the high-level notification. In some examples, the user may wish to be notified of any change in sentiment in the virtually-attended meeting. In other examples, the user may wish to be notified only when the sentiment in the virtually-attended meeting changes in a negative way, e.g., the attendees seem angry or upset. Following the determination to send a high-level notification, the method 200D may return to the method 200A shown in FIG. 2A and proceed with capturing a portion of the virtually-attended meeting at 210. When it is determined at 208-3 that the change in sentiment is not a monitored change in sentiment, the method 200D may return to the method 200A shown in FIG. 2A and resume monitoring the virtually-attended meeting for a triggering event at 204. In some instances (not shown), after it is determined that a high-level notification is not warranted at 208-3, a low-level notification may optionally be sent to the user, as described above with respect to FIG. 2B, or no notification may be sent. In other instances, the user may specify that the change in sentiment should trigger only a low-level notification.

In some examples, as described herein, one or more first types of high-level notifications may be sent in real-time, i.e., as soon as the notification is generated. The first type(s) of high-level notification may include a high-level notification generated in response to detecting keyword(s) used in a question. In other examples, to avoid interruptions to the user, transmission of one or more second types of high-level notifications may be delayed. In some instances, when the user is concurrently attending another meeting, the second type(s) of high-level notification may be queued or held until a quiet period is detected in the concurrently-attended meeting, as described above, and the high-level notification may be sent in response to detecting the quiet period. In other examples, some or all high-level notifications may be held and sent to the user in groups at predefined time intervals. As described herein, the user may specify which type(s) of high-level notifications should be sent in real-time and which type(s) of high-level notifications should be held and when they should be sent. The user may similarly specify how low-level notifications are handled.

Figure 3:
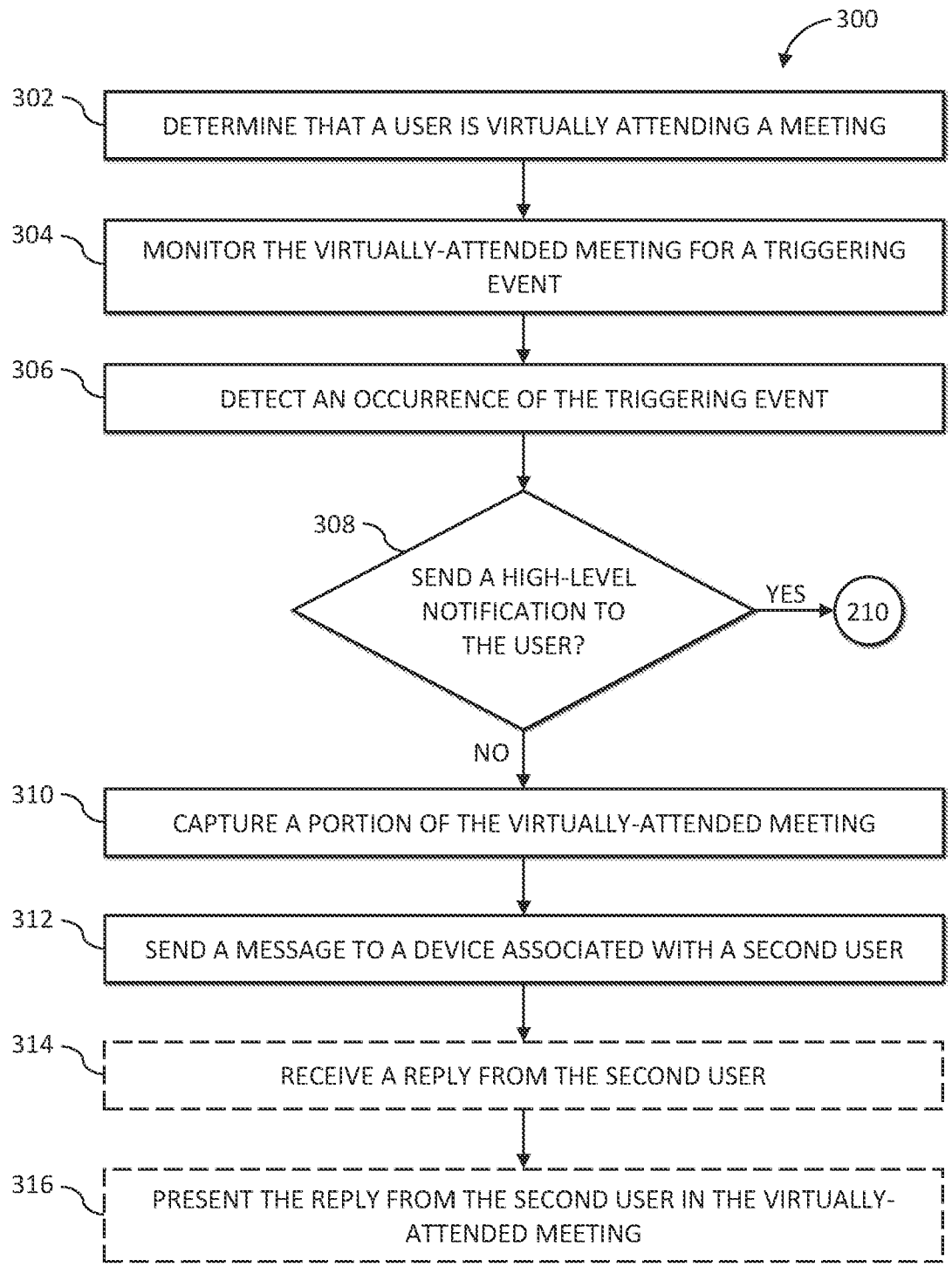
FIG. 3 is a flowchart illustrating a process for participating in a virtually-attended meeting, in accordance with another aspect of the present disclosure.

FIG. 3 illustrates another exemplary method 300 for participating in a virtually-attended meeting in which a user (referred to here as a first user) has designated a second user to receive high-level notifications regarding the virtually-attended meeting. At 302, it is determined that the first user is virtually attending, via the server 110 and/or a first device associated with the first user (e.g., a first one of the user devices 112), a meeting, as described above with respect to 202 in FIG. 2A. While only one virtually-attended meeting is discussed with respect to FIG. 3, it is contemplated that the user may concurrently attend two or more virtually-attended meetings or may concurrently attend one actively-attended meeting and one or more virtually-attended meetings. As discussed with respect to FIG. 3, all references to the "meeting" or the "virtually-attended meeting" are made with respect to the meeting that the first user is virtually attending. In some examples, the second user may be attending the meeting, actively or virtually. In other examples, the second user may not be attending the meeting.

At 304, the virtually-attended meeting is monitored for a triggering event, and at 306, an occurrence of a triggering event is detected in the virtually-attended meeting, as described above with respect to 304 and 306, respectively, in FIG. 2A. At 308, it is determined, in response to detecting the triggering event in the virtually-attended meeting and based on one or more rules, whether a high-level notification should be sent to the first user. If it is determined at 308 that the high-level notification should be sent to the first user, the method 300 may proceed to 210 in FIG. 2A. However, it may be determined at 308 that the high-level notification should not be sent to the first user. Specifically, it may be determined that the high-level notification should be generated, but the first user may have requested not to receive high-level notifications about this meeting. When requesting not to receive high-level notifications, the first user may choose a second user to receive the high-level notifications instead, in which case the method 300 may continue to 310.

In response to determining that the high-level notification should not be sent to the first user, a portion of the virtually-attended meeting may be captured at 310, in which the portion of the virtually-attended meeting may comprise a predetermined amount of time surrounding the triggering event, i.e., before and/or after the triggering event, as described above with respect to 210 in FIG. 2A. At 312, a message may be sent to a device associated with the second user, e.g., a second one of the user devices 112. The message may include the high-level notification, which includes the captured portion of the virtually-attended meeting, as described above with respect to 212 in FIG. 2A.

The second user may be actively attending (online or in person) the meeting, as an original invitee to the meeting or as a participant who joins the meeting at a later time, as described herein. In examples in which the second user is attending the meeting in person, the second user may provide a reply in person. In other examples, a reply may be received at 314 from the second device associated with the second user, and at 316 the reply from the second user may be presented in the meeting, as described above with respect to 214 and 216, respectively, in FIG. 2A. The second user may reply with a text-based message, a recorded audio message, and/or a recorded video message. The second user may prepare the reply in real-time or may reply with a pre-prepared response. In some instances, when the second user is not attending the meeting in person or is virtually attending the meeting, the second user may decide to join the meeting with active attendance. For example, instructions may be received, from the second device associated with the second user, to add the second user as an active participant or to change the second user to active participation in the meeting. In other instances, the second user may decide that it would be better for the first user to reply. For example, instructions may be received, from the second device associated with the second user, to send the high-level notification to the user device associated with the first user.

Figure 4:
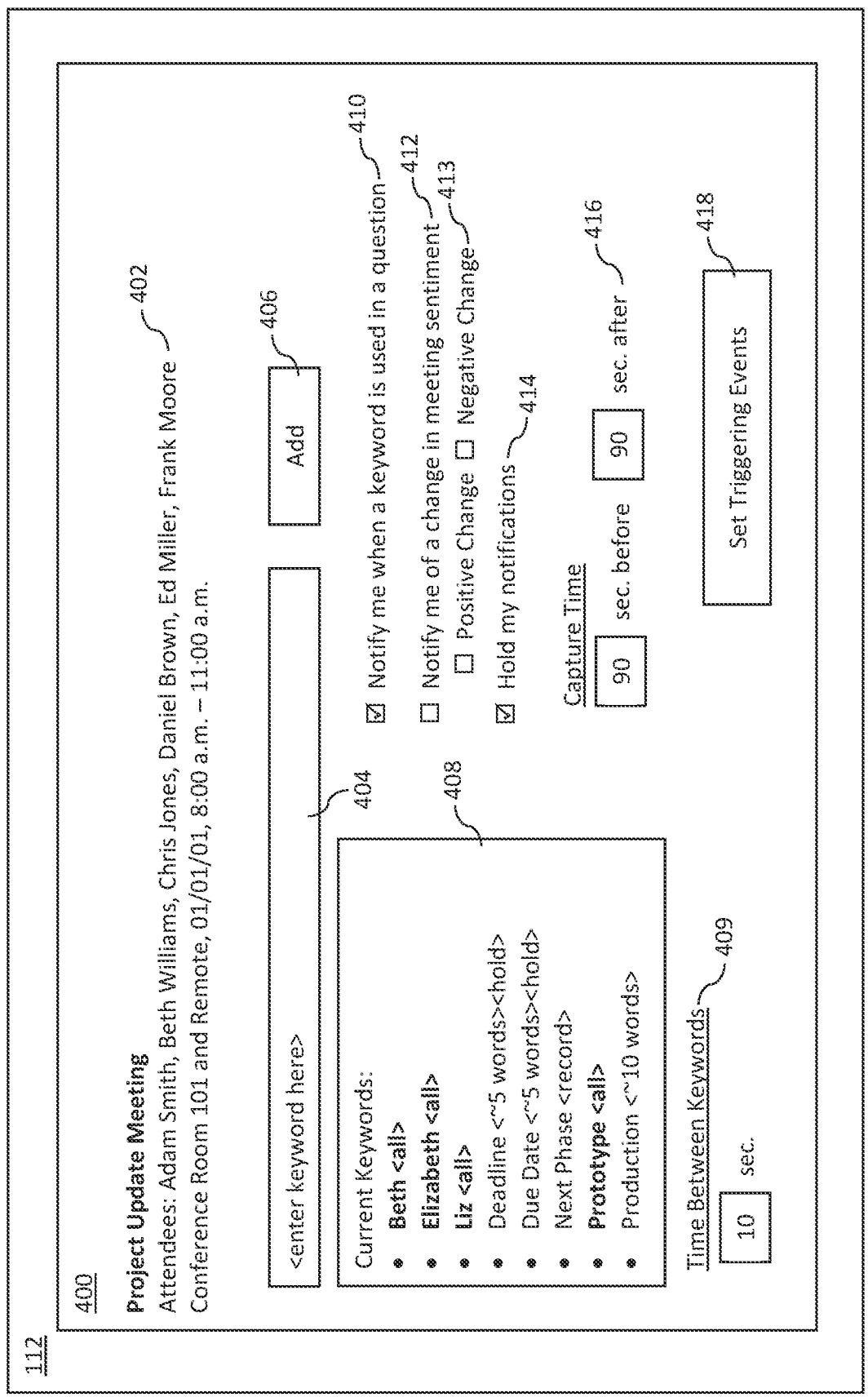
FIG. 4 is an illustration of an example triggering event setup screen in accordance with the present disclosure.

FIG. 4 shows an exemplary triggering event setup screen 400 in accordance with the present disclosure. The triggering event setup screen 400 may comprise a graphical user interface (GUI) displayed on a user device 112. The GUI may be generated by one or more applications (not shown) residing on the user device 112 and/or the server 110 (see FIG. 1). The triggering event setup screen 400 may include meeting information 402, such as a list of attendees, a date, a time, a location, and/or a topic for the meeting. The triggering event setup screen 400 may also have a field 404 where the user may input one or more keywords that the user wants to define as triggering events. Upon entering a keyword into the field 404, the user may then select an "add" button 406. When the user selects the add button 406, the keyword listed in the field 404 is added to a list of current keywords 408. As described in more detail herein, the field 404 and/or the list of current keywords 408 may provide additional options that allow the user to further configure how the one or more keywords define the triggering event and whether a high-level or low-level notification should be generated. Additionally, the triggering event setup screen 400 may include a field 409 for the user to set the predetermined time for the system to wait between multiple utterances of the keywords before generating a notification.

The triggering event setup screen 400 may also include additional fields, such as a field 410 for the user to choose to be notified when a keyword is used in a question; a field 412 to be notified when there is a change in meeting sentiment, which may include fields 413 to specify whether to be notified for a positive change and/or a negative change in sentiment; and/or a field 414 to have notifications held. The triggering event setup screen 400 may also include one or more fields 416 for the user to configure the duration of a captured portion of the meeting. Specifically, the fields 416 allow the user to set the predetermined amount of time before and/or after a triggering event for the system to capture. As shown in FIG. 4, the system may default to a value of 90 seconds, but the user may enter different times in the field(s) 416.

As discussed below, the triggering event setup screen 400 may allow the user to specify whether a high-level or a low-level notification should be sent when a triggering event is detected. The triggering event setup screen 400 may also allow the user to define which notifications are critical enough to be sent in real-time and which notifications should be held, e.g., for a predefined time or until a quiet period is detected in a concurrently attended meeting. In some examples, the user may not wish to receive a notification in certain situations, e.g., when certain keywords or combinations of keywords are detected, but may wish to have the system record that portion of the meeting for later review. The triggering event setup screen 400 may allow the user to specify when recording is triggered and the portion of the meeting that should be captured.

Once the user has defined the one or more keywords and chosen the desired notification options, the user may select a "set triggering events" button 418. When the user selects the set triggering events button 418, the one or more rules may be defined for the triggering event analysis unit 110-2.

The triggering event setup screen 400 is described with reference to the following example meeting, which is also referenced throughout to illustrate features of the system and methods in accordance with the present disclosure. Beth Williams receives an invitation to a project update meeting, which overlaps with another meeting with leadership that she must attend in person. Beth chooses to attend the project update meeting virtually and uses the triggering event setup screen 400 to define the one or more keywords that she wants to be triggering events. Using the field 404 and the add button 406, Beth inputs her name and variations of her name as keywords. Additionally, because Beth's role in the project is to oversee the creation of prototypes in the next phase of the project, she includes several keywords that will notify her if prototype production is discussed. Beth may use additional features (e.g., a menu or other GUI element; not shown) of the field 404 to specify criteria for how the keywords should be used to define triggering events and what level of notification should be generated. For example, Beth indicates that she would like to receive a high-level notification any time the term "prototype" or her name (or a variation thereof) are detected, as indicated by "<all>" in the list of current keywords 408. She also indicates that she would like to receive a high-level notification any time the remaining terms ("deadline," "due date," "next phase," and "production") are detected within a certain number of words of any keyword in the list of current keywords 408, as indicated by "<–5 words>" or "<–10 words>" in the list of current keywords 408. Furthermore, because Beth will be overseeing the next phase, she also indicates that she would like to begin recording the meeting if the phrase "next phase" is detected, as indicated by "<record>" in the list of current keywords 408. All other detections of the one or more keywords that do not meet the criteria for a high-level notification and/or recording may trigger a low-level notification. Beth decides that she would like to be notified if any one of her chosen keywords is used in a question, so she selects the field 410. Beth is not the project lead or meeting organizer, so she chooses to not select the field 412 to be notified when there is a change in meeting sentiment.

When Beth receives a high-level notification, she wants to have enough context to decide how to respond. Therefore, she keeps the capture times in each field 416 at 90 seconds. However, if the project status were to change before the meeting, Beth could change the capture times in each field 416 to increase or decrease the size of the captured portion of the meeting.

Beth wishes to control the transmission of notifications to minimize disruptions in her first meeting. Beth may wish to reduce the number of keyword-related high-level notifications she will receive, so she sets the field 409 controlling the time between keywords to 10 seconds. If the project status changes and Beth decides that she wants to receive more high-level notifications, she may change the field 409 to a longer time (e.g., 15 or 20 seconds). Alternatively, if Beth wants to further reduce the number of high-level notifications she will receive, she may change the field 409 to a shorter time (e.g., 5 seconds). Beth also selects the field 414, which may result in the display of a menu or other GUI element (not shown) that allows her to configure how notifications involving certain keywords are handled. For example, she may indicate that she does not wish for high-level notifications involving certain keywords (e.g., "deadline" and "due date") to be sent in real-time, as indicated by "<hold>" in the list of current keywords 408. She may further specify that high-level notifications involving these keywords should either be held until a quiet period is detected in the first meeting or held for a predefined time (e.g., 5 minutes, 10 minutes, etc.) and sent as a group. All other high-level notifications would be sent in real-time. Beth may similarly specify how some or all low-level notifications should be handled (not shown).

Once Beth has input all of her desired keywords and chosen her notification options, she may select the set triggering events button 418. Should the status of the project change prior to the meeting, Beth may return to the triggering event setup screen 400 to review the list of her selected current keywords 408 and/or her selected fields 410, 412, 414 and make appropriate updates.

Figure 5:
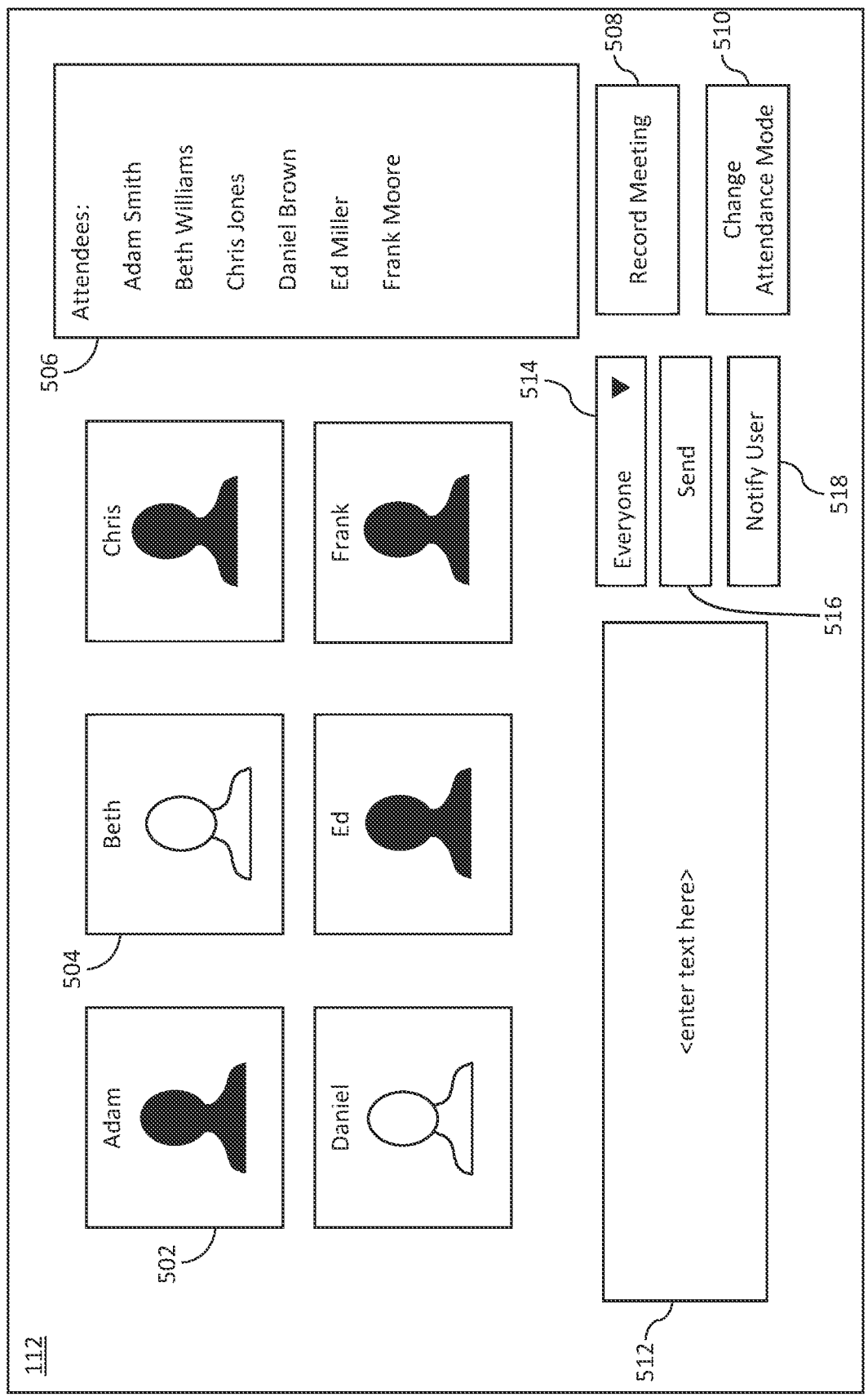
FIG. 5 provides an example of a meeting screen in accordance with the present disclosure.

FIG. 5 shows an exemplary meeting screen 500 in accordance with the present disclosure. The meeting screen 500 may include windows for each of the attendees. The windows depict a video feed or a photo for an active attendee 502 (depicted with a filled shape) and an avatar for a virtual attendee 504 (depicted with an open shape), in which the avatar represents a person for whom an automated attendant is attending the meeting on the user's behalf. The meeting screen 500 may also include a list 506 of all of the attendees 502, 504. The list 506 allows the attendees 502, 504 to see everyone who is attending the meeting. The virtual attendees 504 are included in the list 506 of attendees, but the avatar representing the virtual attendee(s) 504 may inform the active attendee(s) 502 who is attending the meeting virtually. Additionally, the meeting attendees 502, 504 may receive an announcement, e.g., via the meeting screen 500 or via a verbal announcement, when someone decides to attend the meeting virtually.

The meeting screen 500 may also include a "record meeting" button 508. When a user selects the record meeting button 508, recording of the meeting may commence, e.g., via the capture unit 110-3 of the server 110 (FIG. 1). Alternatively, the meeting may be automatically recorded when any attendee 504 is virtually attending. In either case, a notification may be provided, e.g., via the meeting screen 500 or a verbal notification, to the attendees 502, 504, that the meeting is being recorded. In some examples, permission to record may be granted by a meeting leader or host. The recording may be a transcript, an audio recording, and/or a video recording. The recording may be sent to attendees 502, 504 upon completion of the meeting. If there are privacy concerns about the meeting, the recording may be secured and marked non-distributable. In some examples, playback of the recording and/or access to the meeting transcript may be restricted only to a meeting portal and authorized users of the portal. The meeting screen 500 may also have a "change attendance" mode button 510. When the user selects the change attendance mode button 510, he or she may be switched from virtual attendance to active attendance or vice versa, with switching from active to virtual attendance involving activation of the automated attendee and replacement of the video/photo with an avatar.

The meeting screen 500 may include a chat box 512 that allows the user to exchange text-based messages with the other attendees 502, 504. The user may be able to designate the recipient(s) of the text-based message using a drop-down menu 514, which shows a list of attendees. By using this drop-down menu 514, the user may send a private message to only the selected attendees. Once the user has entered the text-based message in the chat box 512 and selected the recipients using the drop-down menu 514, the user may select a "send" button 516. When the send button 516 is selected, the text-based message will be sent, e.g., via the server 110, to the user device 112 of the chosen recipients. Virtual attendees 504 may choose to receive messages from the chat box 512 via an instant messaging service, for example. Additionally, the meeting screen 500 may include a "notify user" button 518. A drop-down menu 514 may be used to select a recipient, and when the notify user button 518 is selected, the system will send a high-level notification to the user device 112 associated with the selected recipient.

Continuing with the example meeting, Chris is actively attending the project update meeting. Chris' meeting screen 500 shows that he, Adam, Ed, and Frank are active attendees 502 and that Beth and Daniel are virtual attendees 504. The attendee list 506 shows all six attendees 502, 504. During the meeting, Chris wishes to send a private message to Beth. Chris may enter his message in the chat box 512, select Beth in the drop-down menu 514, and select the send button 516 to send Beth the message. The message may be transmitted to Beth's user device 112 via an instant messaging service or other service. Alternatively, if Chris wishes to notify Beth about the status of the meeting or request input from her, he may select Beth in the drop-down menu 514 and select the notify user button 518 to have a high-level notification sent to Beth's user device 112, as described above. Chris decides that he would like to have a recording of the meeting to reference later. Recording of the meeting may already be in progress because there are virtual attendees 504. However, if all attendees were active, Chris could select the record meeting button 508 to record the meeting if he wants to create a record of the meeting.

As the meeting progresses, Chris may have a conflicting meeting that he needs to actively attend or may decide that he no longer needs to actively attend the project update meeting. He may select the change attendance mode button 510 to switch to virtual attendance. Chris' window on the meeting screen 500 will be changed from a photo or video to an avatar to inform the other attendees that he is no longer actively attending. Chris may also be presented with the triggering events setup screen 400 (FIG. 4) on the user device 112 associated with him so that he can set his triggering event preferences as described above.

Figure 6B:
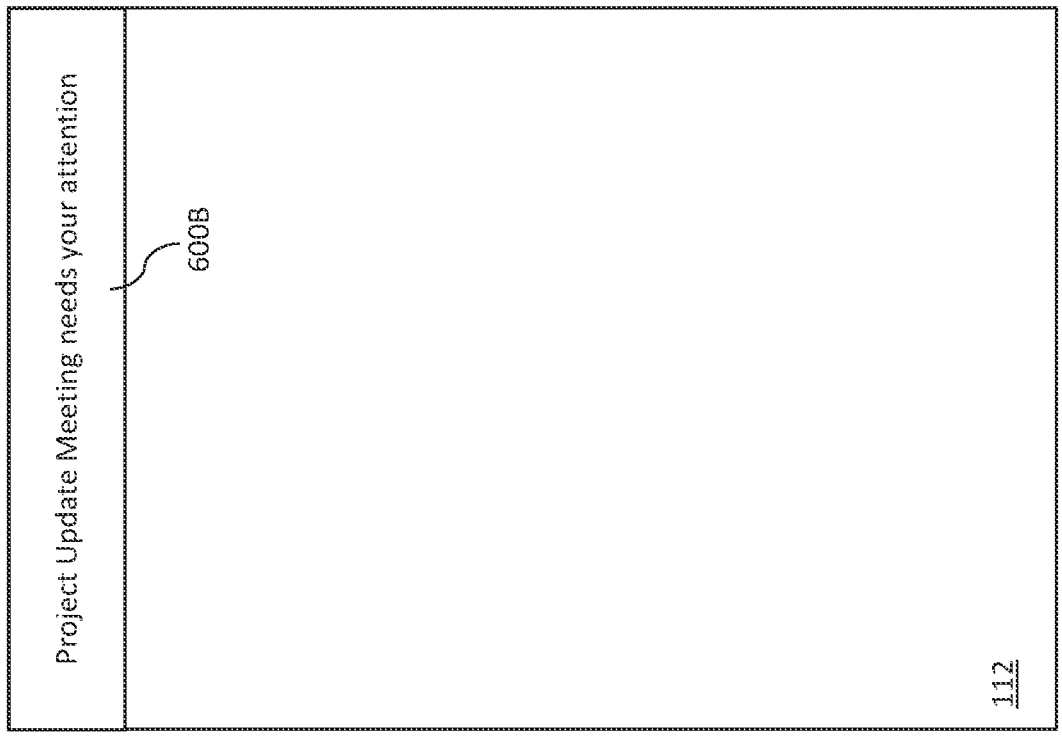
FIGS. 6A and 6B are illustrations of different level notifications in accordance with the present disclosure.
Figure 6A:
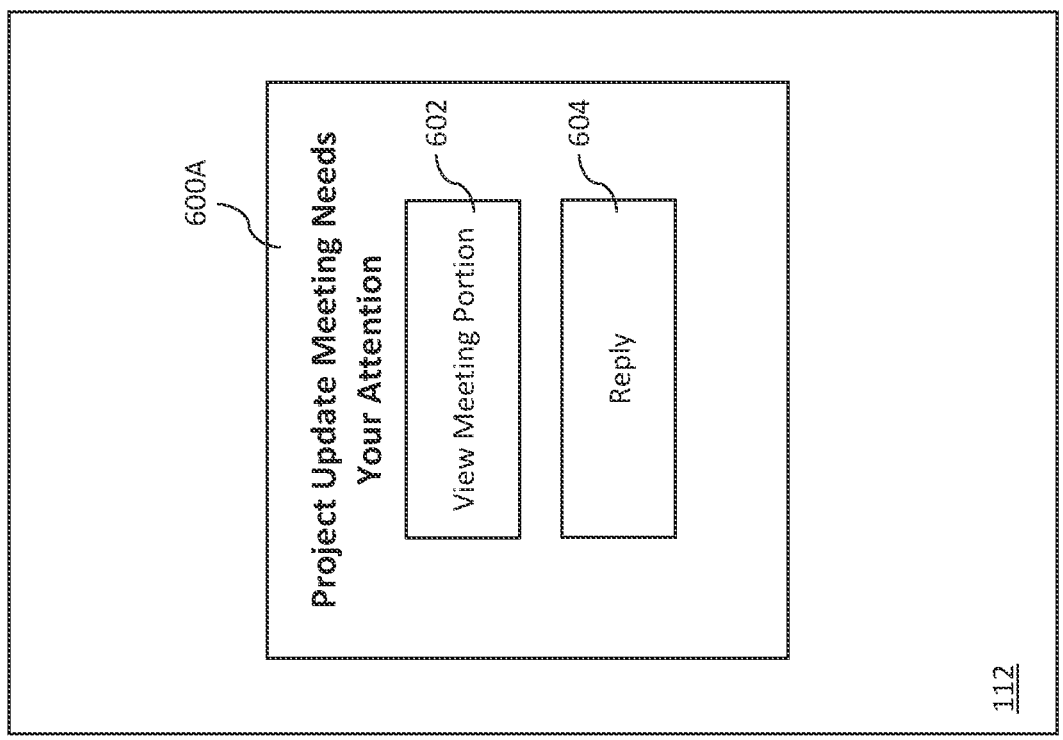

FIGS. 6A-7B show exemplary notifications 600A, 600B and reply option menus 700A, 700B in accordance with the present disclosure. As shown in FIG. 6A, a high-level notification 600A may be generated by the notifying unit 110-3 in response to the trigger event analysis unit 110-2 determining that the user should be sent a high-level notification 600A, as discussed above. The high-level notification 600A may include, for example, a popup notification that is centered on a screen display of the user device 112. The high-level notification 600A may also cause the user device 112 to play an audible tone and/or sound. Additionally, the high-level notification 600A may cause the user device 112 to vibrate, if applicable. As discussed above, the high-level notification 600A may comprise a portion of the meeting, which may be accessed if the user selects a "view meeting portion" button 602. When the user selects the view meeting portion button 602, the portion of the meeting is presented to the user on the user device 112. The high-level notification 600A may also include a "reply" button 604. When the user selects the reply button 604, a reply options menu 700A is presented, as discussed below with reference to FIG. 7A.

FIG. 6B shows an exemplary low-level notification 600B. The low-level notification 600B may be generated by the notifying unit 110-3 in response to the trigger event analysis unit 110-2 determining that the user should be sent a low-level notification 600B, as discussed above. The low-level notification 600B may include, for example, a visual notification that only covers a small portion of the display screen of the user device 112. As shown in FIG. 6B, the low-level notification 600B may be located along the top of the screen display of the user device 112. In other examples (not shown), the low-level notification 600B may be displayed in a different location on the screen display of the user device 112. The low-level notification 600B may also cause the user device 112 to play an audible tone and/or sound that is different from the tone and/or sound for the high-level notification 600A. Additionally, the low-level notification 600B may cause the user device 112 to vibrate, if applicable. The vibration pattern for the low-level notification 600B may differ from the vibration pattern for the high-level notification 600A. The user may define, e.g., via the triggering event setup screen 400 (FIG. 4), the tone, sound, and/or vibration pattern for both levels of notifications 600A, 600B. Although two levels of notifications are shown, it may be understood that other levels of notifications may be configured, along with one or more visual, audible, and/or tactile properties associated therewith.

Figure 7B:
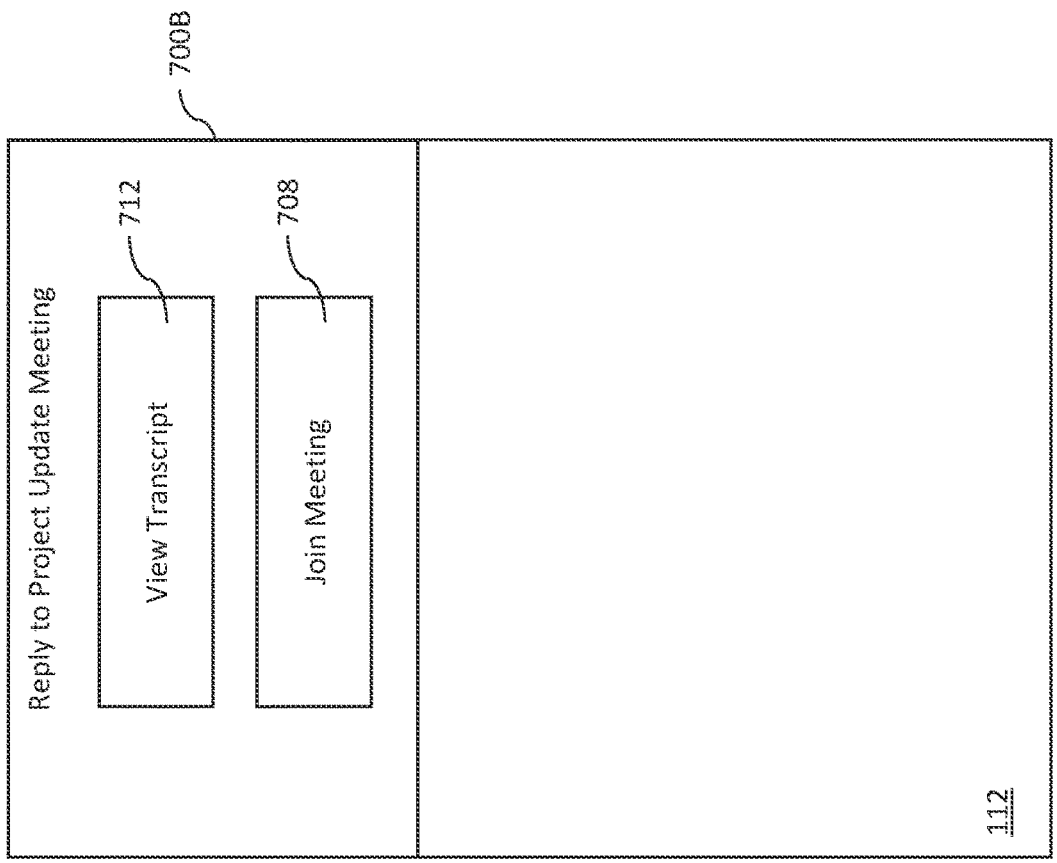
FIGS. 7A and 7B are examples of different reply menus in accordance with the present disclosure.
Figure 7A:
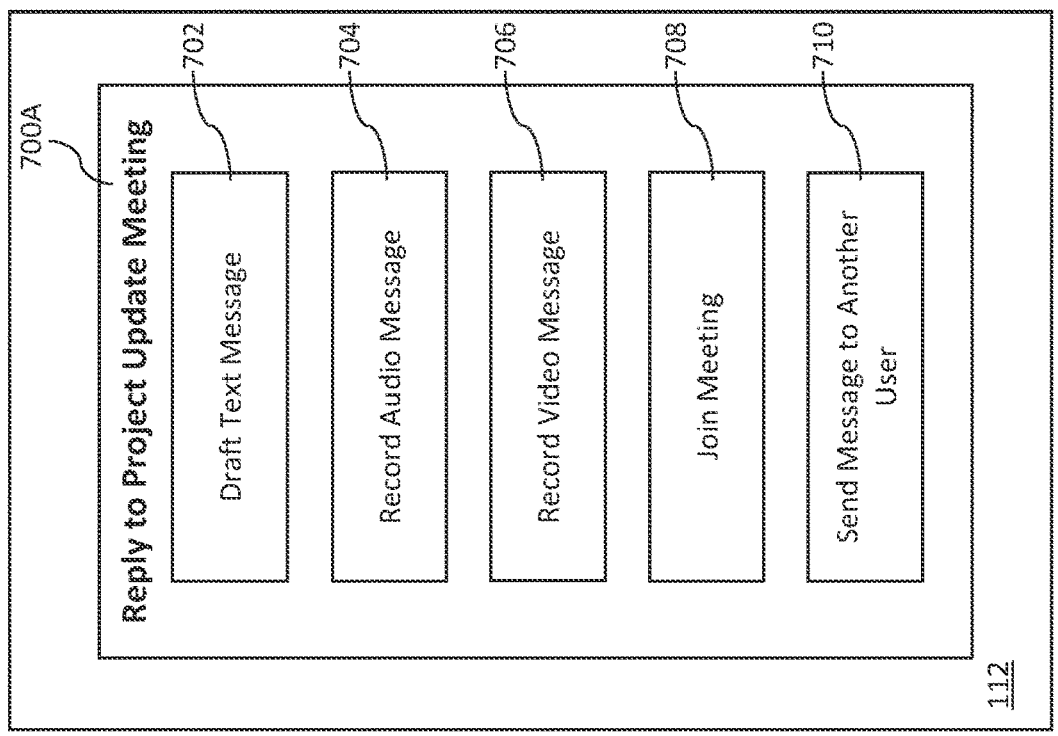

FIG. 7A shows an exemplary high-level notification reply menu 700A. The high-level notification reply menu 700A may include options for the user to draft a text message 702, record an audio message 704, record a video message 706, join the meeting 708, or send a message to another user 710. If the user selects the draft text message option 702, the user device 112 may display a textbox (not shown) for the user to input the text message. If the user selects the record audio message option 704, the user may be presented with the options (not shown) to either record an audio message in real-time or to upload a pre-recorded audio message. Similarly, if the user selects the record video message option 706, the user may be presented with the options (not shown) to either record a video message in real-time or to upload a pre-recorded video message. If the user selects the join the meeting option 708, the user may be switched from virtual attendance to active attendance. Finally, if the user selects the send message to another user option 710, the user device 112 may display a textbox (not shown) for the user to input the message for the second user.

FIG. 7B shows an exemplary low-level notification reply menu 700B. The low-level notification reply menu 700B may include an option to join the meeting 708, view the meeting transcript 712, or view sentiment change 714 (when the user specifies that a sentiment change should trigger a low-level notification 600B). If the user selects the join the meeting option 708, the user may be switched from virtual attendance to active attendance. If the user selects the view transcript option 712, the meeting transcript is sent to the user device 112 for the user to review. If the user selects the view sentiment change option 714, the system may, in some examples, provide an indication (not shown) of the detected sentiment change, e.g., using ASR and NLP.

Continuing with the example meeting, it is detected that the keyword "production" was used in a question during the project update meeting. Based on Beth's preferences configured using the triggering event setup screen 400 in FIG. 4, the server 110, e.g., via the notifying unit 110-4 (FIG. 1), may determine that the high-level notification 600A shown in FIG. 6A should be sent to the user device 112 associated with Beth in real-time. The capture unit 110-3 (FIG. 1) captures a portion of the meeting surrounding the triggering event, e.g., by isolating 30 seconds before and after the keyword "production" is detected. Beth's user device 112 then displays the high-level notification 600A, plays a sound, and vibrates.

Beth selects the view meeting portion button 602 and learns that Adam asked "When will we begin production?" Beth then selects the reply button 604, which causes the high-level notification reply menu 700A in FIG. 7A to be displayed on her user device 112. Beth selects the draft a text message option 702 and enters "We'll begin production on Feb. 1" in the textbox. The reply from Beth's user device 112 is received and is presented to the other attendees, e.g., displayed in the chat box 512 or converted to speech and played for the other attendees. However, if Beth needs to provide a more detailed response, she may choose the record an audio or video message option 704 or 706 and record a reply in real-time. Alternatively, if Beth had pre-prepared a message (e.g., a video/audio recording or a text message) that answers Adam's question, she may upload her pre-prepared answer. Additionally, if Beth feels that she needs to actively contribute to the discussion, she may choose the join meeting option 708. Finally, if Beth is unable to prepare a reply, she may choose the send a message to another user option 710 and provide instructions to send a message to another user. For example, Beth may send a message to her assistant, George (not shown), and include the portion of the meeting and/or a suggestion that he should tell the attendees the production date that is listed on the project calendar.

As the meeting continues, it is detected that "production" is said three more times during the meeting but not in a manner that would warrant a high-level notification 600A, i.e., "production" is not used in a question and is not spoken within 10 words of any keyword. Therefore, it is determined that three low-level notifications 600B should be sent to the user device 112 associated with Beth. Based on Beth's preferences configured using the triggering event setup screen 400 in FIG. 4, the low-level notifications 600B (FIG. 6B) are not sent until a quiet period is detected in Beth's actively-attended meeting. Beth's user device 112 then displays the low-level notification 600B, plays a sound different from the sound used for the high-level notification 600A, and vibrates with a vibration pattern different from the pattern used for the high-level notification 600A.

When Beth selects the low-level notification 600B, the low-level notification reply menu 700B in FIG. 7B is shown on her user device 112. Beth selects the view transcript option 712. The capture unit 110-3 (FIG. 1) may, for example, isolate a portion of the transcript surrounding the triggering events and send the portions to Beth's user device 112. Beth sees that the active attendees are discussing what must be completed prior to production and she decides that she does not need to contribute. Alternatively, if Beth decides that she needs to contribute, she may select the join meeting option 708 to switch to active attendance in the project update meeting.

Systems and methods in accordance with the present disclosure may optimize usage of system resources by limiting the number of active connections. In the example meeting described above, the project update meeting may conflict with another online meeting Beth plans to actively attend or with another task that Beth must perform. In a conventional online meeting platform, Beth would have to actively attend both meetings simultaneously in the case of the conflicting meetings or hold off on performing the other task in the case of a conflicting task. In general, a person can actively participate in only one meeting at a time, so there may be delays or confusion in the meeting(s), e.g., when Beth's input is requested and she does not respond or has to ask the speaker to repeat the question. In a meeting platform in accordance with the present disclosure, Beth is able to attend her first meeting actively and virtually attend any additional meetings that overlap with her first meeting in the case of conflicting meetings. Beth may be actively connected to one or more of the additional meetings only when her input is needed. Thus, there is only one active meeting connection at a time instead of multiple, concurrent active connections. Likewise, in the case of a conflicting task, Beth may virtually attend the meeting and may request an active connection only if needed, which eliminates the need for an active connection for the entire duration of the meeting. In both cases, an automated attendee represents Beth in the virtually-attended meeting(s), which may help to reduce system resource usage and network traffic. Users can more easily schedule meetings without spending time to find a convenient meeting time for all attendees. Additionally, by allowing virtually-attended meetings, the presently disclosed meeting platform reduces the time that users spend actively attending meetings and gives them more time to work on non-meeting tasks. Furthermore, the system informs the other attendees that Beth is attending virtually so that they are not expecting immediate responses from her.

In addition, attendees may switch from active to virtual attendance as desired during the meeting, which further limits the number and/or duration of active connections and may help to further reduce system resource usage and network traffic. As described above, Chris is able to switch to virtual attendance to actively join another meeting or when he determines that he no longer needs to actively attend the project update meeting. While Chris could also exit a conventional online meeting, he may worry about missing a critical discussion that may occur after his exit, which may cause him to stay actively connected to the meeting. Additionally, while it would be possible for Chris to work on other tasks while attending the meeting, there is a chance that he will miss something in the meeting because he is not actively paying attention. In a meeting platform in accordance with the present disclosure, Chris is able to change his attendance to virtual and know that he will be notified if he needs to contribute to the meeting. This flexibility allows him to focus on his other tasks, while knowing that he will not miss critical information in the project update meeting.

Figure 8:
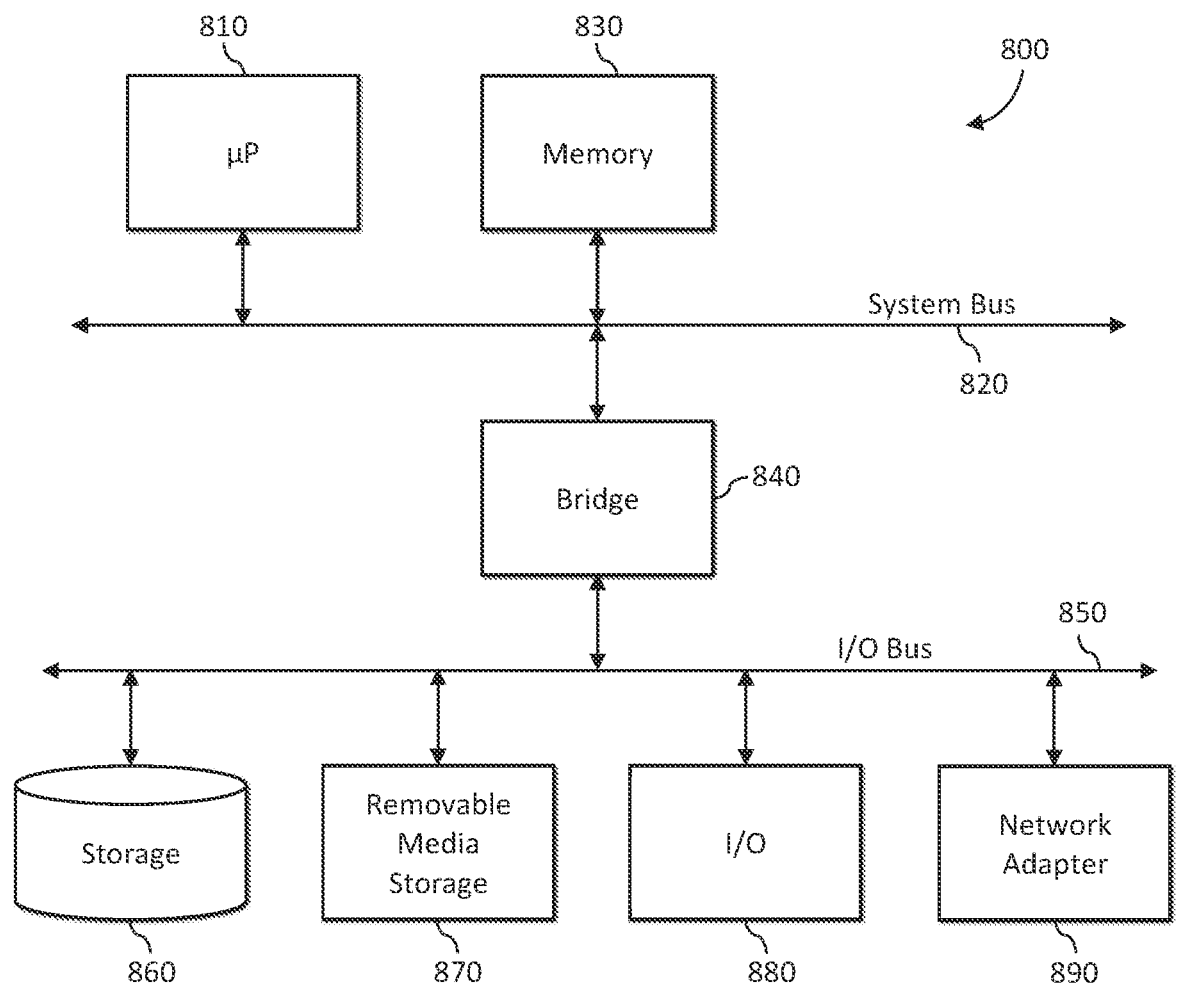
FIG. 8 is a block diagram of a computer system having a computer readable storage medium for implementing functions, according to various aspects of the present disclosure, as described in greater detail herein.

Referring to FIG. 8, a block diagram of a data processing system 800 is depicted in accordance with the present disclosure. The data processing system 800 may comprise a symmetric multiprocessor (SMP) system or other configuration including a plurality of processors 810 connected to system bus 820. Alternatively, a single processor 810 may be employed. Also connected to system bus 820 is local memory 830. An I/O bus bridge 840 is connected to the system bus 820 and provides an interface to an I/O bus 850. The I/O bus 850 may be utilized to support one or more buses and corresponding devices, such as storage 860, removable media storage 870, input/output devices (I/O devices) 880, network adapters 890, etc. Network adapters may also be coupled to the system to enable the data processing system 800 to become coupled to other data processing systems or remote printers or storage devices through intervening private or public networks.

Also connected to the I/O bus may be devices such as a graphics adapter, storage and a computer usable storage medium having computer usable program code embodied thereon. The computer usable program code may be executed to implement any aspect of the present disclosure, for example, to implement any aspect of any of the methods and/or system components illustrated in FIGS. 1-7B.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. A computer storage medium does not include propagating signals.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Network using a Network Service Provider).

Aspects of the present disclosure are described herein with reference to flowchart illustrations and/or block diagrams of methods, apparatus (systems) and computer program products in accordance with the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various examples with various modifications as are suited to the particular use contemplated.

What is claimed is:

1. A method for participating in a meeting, the method comprising:
   determining that a user is virtually attending a meeting;
   monitoring the meeting for a triggering event;
   detecting an occurrence of the triggering event;
   determining, in response to detecting the occurrence of the triggering event in the meeting that the user is virtually attending, based on one or more rules, whether to send a high-level notification to the user;
   capturing, in response to determining that the user should be sent the high-level notification, a portion of the meeting, wherein the portion of the meeting comprises a predetermined amount of time surrounding the triggering event; and sending, to a device associated with the user, the high-level notification, wherein the high-level notification comprises the portion of the meeting, wherein detecting the occurrence of the triggering event comprises detecting an utterance of one or more keywords and wherein the one or more rules indicate to send the user a low-level notification upon detecting only a first utterance of the one or more keywords and the high-level notification upon detecting a second utterance of the one or more keywords within a predefined amount of time from the first utterance.

2. The method of claim 1, further comprising:
receiving, from the device associated with the user, a reply; and
presenting the reply from the user in the meeting.

3. The method of claim 2, wherein the reply from the user comprises at least one of a text-based message, a recorded audio message, or a recorded video message.

4. The method of claim 1, wherein:
when the high-level notification is of a first type, the high-level notification is sent in real-time; and
when the high-level notification is of a second type, the high-level notification is held.

5. The method of claim 1, further comprising determining that the user is actively attending a concurrent second meeting.

6. The method of claim 1, wherein detecting the triggering event comprises detecting, via a speech analysis unit, that one or more keywords are used in a question, and wherein the one or more rules indicate to send the user the high-level notification upon detecting that the one or more keywords are used in the question.

7. The method of claim 1, wherein detecting the triggering event comprises detecting, via a speech analysis unit, a change in a sentiment of the meeting, and wherein the one or more rules indicate to send the user the high-level notification upon detecting the change in the sentiment of the meeting.

8. The method of claim 1, further comprising:
after sending the high-level notification, receiving, from the device associated with the user, instructions to send a message to a second device associated with a second user, wherein the message comprises at least one of the high-level notification or one or more suggestions for responding to the high-level notification.

9. The method of claim 1, further comprising:
after sending the high-level notification, receiving, from the device associated with the user, instructions to temporarily change the user to active participation in the meeting; and
presenting, in real-time, a reply from the user in the meeting.

10. A system for participating in a meeting, the system comprising:
a processor coupled to memory, wherein the memory includes a program that instructs the processor to perform:
determining that a user is virtually attending a meeting;
monitoring the meeting for a triggering event;
detecting an occurrence of the triggering event;
determining, in response to detecting the occurrence of the triggering event in the meeting that the user is virtually attending, based on one or more rules, whether to send a high-level notification to the user;
capturing, in response to determining that the user should be sent the high-level notification, a portion of the meeting, wherein the portion of the virtually attended meeting comprises a predetermined amount of time surrounding the triggering event; and
sending, to a device associated with the user, the high-level notification, wherein the high-level notification comprises the portion of the meeting,
wherein detecting the occurrence of the triggering event comprises detecting one or more keywords, and wherein the one or more rules indicate to send the user a low-level notification upon detecting only a first utterance of the one or more keywords and the high-level notification upon detecting a second utterance of the one or more keywords within a predefined amount of time from the first utterance.

11. The system of claim 10, wherein the program further instructs the processor to perform:
receiving, from the device associated with the user, a reply; and
presenting the reply from the user in the meeting.

12. The system of claim 10, wherein the program further instructs the processor to perform:
determining that the user is actively attending a concurrent second meeting.

13. The system of claim 10, wherein detecting the triggering event comprises detecting one or more keywords, and wherein the system comprises a graphical user interface (GUI), with one or more fields for the user to define the one or more keywords.

14. The system of claim 10, wherein detecting the triggering event comprises detecting, via a speech analysis unit, that one or more keywords are used in a question, and wherein the one or more rules indicate to send the user the high-level notification upon detecting that the one or more keywords are used in the question.

15. The system of claim 10, wherein the program further instructs the processor to perform:
after sending the high-level notification, receiving, from the device associated with the user, instructions to temporarily change the user to active participation in the meeting; and
presenting, in real-time, a reply from the user in the meeting.

16. A method for participating in a meeting, the method comprising:
determining that a first user is virtually attending a meeting;
monitoring the meeting for a triggering event;
detecting an occurrence of the triggering event;
determining, in response to detecting the triggering event in the meeting that the first user is virtually attending, based on one or more rules, whether to send a high-level notification to the first user;
capturing, in response to determining that the high-level notification should not be sent to the first user, a portion of the meeting, wherein the portion of the meeting comprises a predetermined amount of time surrounding the triggering event; and
sending, to a device associated with a second user, a message comprising the portion of the meeting,
wherein detecting the occurrence of the triggering event comprises detecting one or more keywords, and wherein the one or more rules indicate to send the user a low-level notification upon detecting only a first utterance of the one or more keywords and the high-level notification upon detecting a second utterance of the one or more keywords within a predefined amount of time from the first utterance.

17. The method of claim 16, further comprising:
receiving, from the device associated with the second user, instructions to send a high-level notification to a device associated with the first user.

18. The method of claim 16, further comprising:
receiving, from the device associated with the second user, a reply; and
presenting the reply in the meeting.

\* \* \* \* \*